Aug. 29, 1950  D. C. CAMPION, SR  2,520,527
CONVEYER
Filed June 27, 1946  2 Sheets-Sheet 1

INVENTOR
DONALD C. CAMPION, SR.
BY
Barnes, Kisselle, Laughlin & Raisch
ATTORNEYS Aug. 29, 1950     D. C. CAMPION, SR     2,520,527
CONVEYER Filed June 27, 1946     2 Sheets-Sheet 2

INVENTOR
DONALD C. CAMPION, SR.

BY Barnes, Kisselle, Laughlin & Raisch

ATTORNEYS

Patented Aug. 29, 1950

2,520,527

UNITED STATES PATENT OFFICE 2,520,527

CONVEYER

Donald C. Campion, Sr., Detroit, Mich., assignor to Loftus Engineering Corporation, Pittsburgh, Pa., a corporation of Maryland Application June 27, 1946, Serial No. 679,662

12 Claims. (Cl. 259—72)

This invention relates to a conveyor and more particularly to a conveyor which is useful, for example, in quenching, washing, rinsing, pickling, or other operations where the work is conveyed through the solution with a continuous but agitated flow while in the solution.

It is an object of this invention to produce a conveyor which will convey articles with a continuous flow but with agitation superimposed upon the continuous flow.

It is an object of this invention to produce such a conveyor which is of simple structure, efficient and reliable in operation and economical to build.

Figure 1:
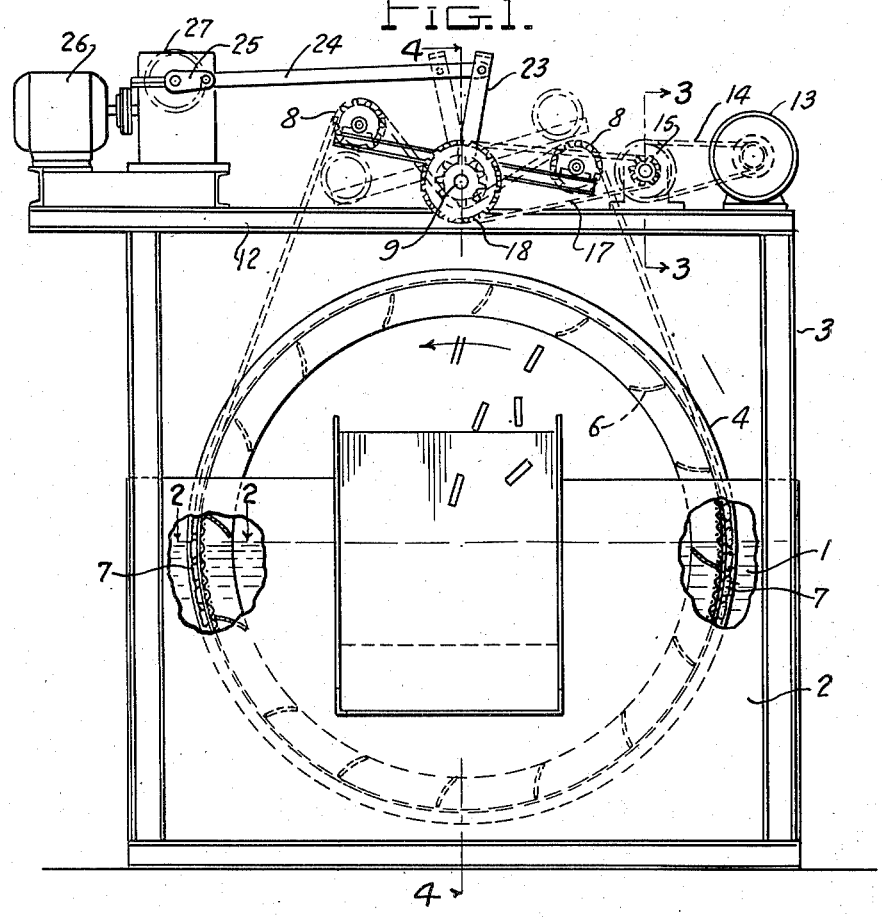

Fig. 1 is a side elevation showing my oscillating conveyor.

Figure 2:
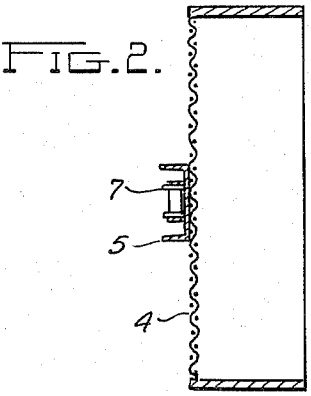
Figure 3:
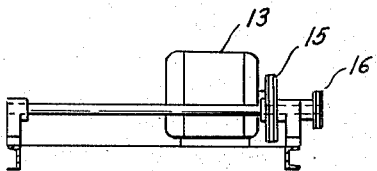
Figure 4:
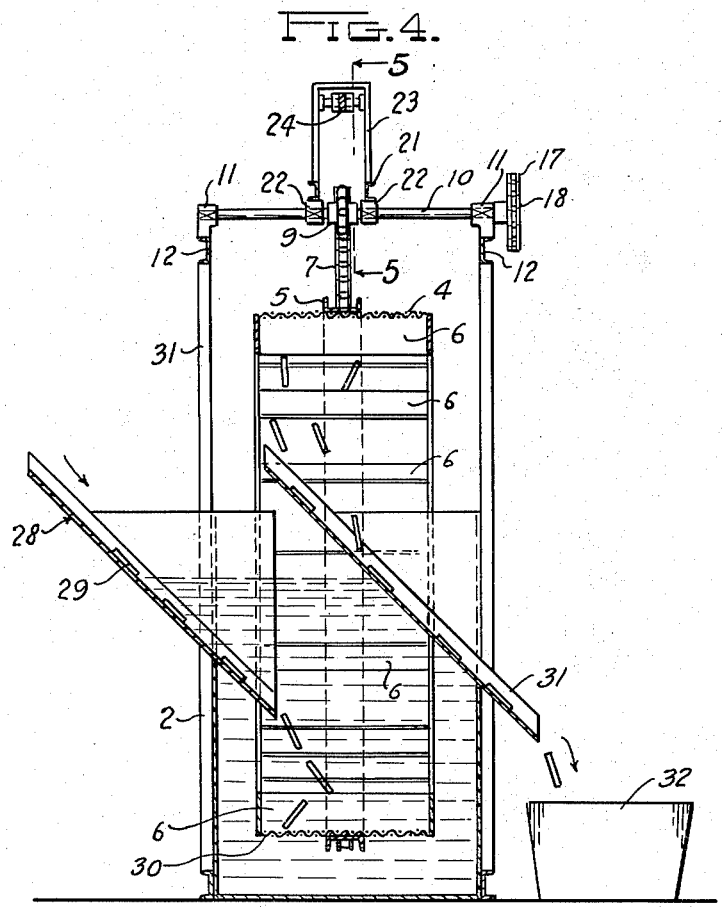

Figs. 2, 3 and 4 are sections along lines 2—2, 3—3 and 4—4 of Fig. 1 respectively.

Figure 5:
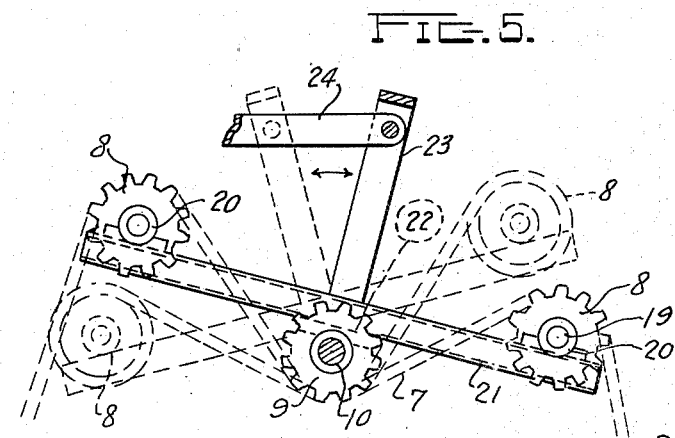

Fig. 5 is a detail of the mechanism for oscillating the conveyor.

By way of illustration, my conveyor is shown conveying work through a body of liquid 1 in tank 2. The frame of my conveyor apparatus is designated 3.

The conveyor proper comprises a squirrel cage 4 in the form of a foraminated or wire mesh cylinder or open ended drum provided with an external circumferential track 5 fixed on the outside of the conveyor. The wire mesh screen permits draining of the liquid. The conveyor 4 is provided with circumferentially spaced flights 6 for receiving and carrying the work.

Conveyor 4 is cradled in, and suspended by, chain 7 which passes over idler sprockets 8 and under driving sprocket 9. Driving sprocket 9 is fixed on shaft 10 which is journalled at its opposite ends in bearings 11 fixed on the upper cross members 12 of frame 3.

Shaft 10 is rotated by electric motor 13 through belt 14, pulley 15, sprocket 16, chain 17 and sprocket 18 fixed on shaft 10.

Idler sprockets 8 are fixed on shafts 19 which are journalled in bearings 20 which are fixed on pivoted frame 21. Frame 21 is fixed on bearings 22 in which shaft 10 is journalled. Thus, frame 21 is free to oscillate or pivot upon shaft 10. Oscillation of frame 21 upon shaft 10 is effected by means of arm 23 which is fixed to frame 21 and positioned perpendicular thereto. Thus, frame 21 and arm 23 form a double armed bell crank. Arm 23 is connected by connecting rod 24 with crank 25 which is driven by electric motor 26 through gear reduction box 27.

Work 29 which is to be immersed in the bath (in this case, for purposes of illustration, an oil or water quench) enters the bath by sliding down chute 28 into the conveyor proper as at 30. Conveyor drum 4 is rotated counterclockwise by chain 7 and flights 6 carry the work toward the top of the conveyor where the work falls off the flights and slides down the discharge chute 31 into a receptacle 32. Chutes 28 and 31 are fixed on frame 3.

As the conveyor 4 rotates counterclockwise and effects a continuous flow of the work through liquid 2, an oscillating motion is superimposed upon the rotating motion by means of the oscillating idler sprockets 8 over which the chain 7 runs. Driving sprocket 9 meshes with chain 7 and drives drum 4 counterclockwise with a continuous counterclockwise rotation. Simultaneously as motor 26, rotating crank arm 25 and connecting rod 24 oscillate frame 21 upon shaft 10, the idler sprockets 8 see-saw or oscillate upwardly and downwardly as indicated by the dotted line showings in Figs. 1 and 5. This oscillating motion of idler sprockets 8 is transmitted through chain 7 to the squirrel cage conveyor 4 where it manifests itself in a circular oscillating motion around the horizontal axis of drum 4. The net result of these two motions is that the work is swished back and forth through the bath or vice versa while the work is being conveyed through the bath. This insures uniform and speedy treatment of the work. It is, of course, understood that the above mechanism is shown by way of illustration and not for purposes of limitation.

My invention is essentially characterized by a mechanism which simultaneously oscillates the work while simultaneously conveying the work along a course with a continuous flow and more specifically the oscillation, as shown, can be a circular oscillating motion and the course along which the work is conveyed a circular course, the circular oscillating motion and the circular course of travel having a common axis or center.

It will be seen that the chain 7 travels continuously in a counterclockwise direction but the speed at which sprockets 8 oscillate upwardly and downwardly is preferably greater than the linear speed of chain 7. However, the speed at which sprockets 8 travel upwardly and downwardly can be equal to, or even less than, the linear speed of chain 7. Consequently, as frame 21 pivots clockwise, Figs. 1 and 5, chain 7 will be moved bodily in a clockwise direction at a greater speed than sprocket 9 is driving the chain counterclockwise. The net result will be that drum 4 will actually oscillate in a clockwise direction, that is, make a clockwise stroke. Then as frame 21 oscillates counterclockwise, this motion will be superimposed upon the counterclockwise travel of chain 7 and the net result will be that drum 4 will oscillate on a counterclockwise stroke at a greater speed than the speed of chain 7. Thus, I have a conveyor for holding the work which is driven by a mechanism, specifically chain 7, which travels continuously in one direction and superimposed upon this continuous movement of chain 7 is an oscillating movement caused by a secondary driving mechanism, specifically oscillating frame 21 and idler sprockets 8, which alternately bodily move chain 7 in the direction of its travel and reversely thereof at a greater rate of speed than the speed of travel of the chain continuously in the one direction.

The work is herein shown, by way of example only, traveling along a circular course but it is understood that the course of the work could just as well be along a rectilinear course wherein the work during its continuous linear progression would be oscillated back and forth.

Although I have shown the drum rotated by chain and sprockets, it is obvious that equivalent means can be substituted therefor; namely, belt and pulleys, and a chain and sprockets are herein used generically to include a belt and pulleys.

I claim:

1. A conveyor comprising work receiving means, means for actuating said work receiving means, primary driving mechanism operatively connected with said actuating means for moving said work receiving means unidirectionally, and secondary driving mechanism operatively connected to said actuating means for moving said work receiving means intermittently in the same and reverse directions that the primary driving mechanism is moving the work receiving means and at a greater speed than that at which the primary driving mechanism is moving the work receiving means whereby the work is oscillated back and forth along its course of travel and always with a net forward advance along its course at the end of each cycle of oscillation.

2. A conveyor comprising work receiving means, means for actuating said work receiving means, primary driving mechanism operatively connected to said actuating means for moving the work receiving means in one direction, and secondary driving means operatively connected to said actuating means for alternately moving said work receiving means bodily in the above said direction and reversely thereof at a greater rate of speed than the speed at which the primary driving mechanism is moving the work receiving means in the above said one direction whereby as the work receiving means travels along its course it is simultaneously oscillated back and forth along said course.

3. A conveyor comprising work receiving means, primary driving mechanism operatively connected to said work receiving means for moving said work receiving means in one direction, and secondary driving means operatively connected to said primary driving means for superimposing upon the primary driving means an oscillating movement backwardly and forwardly of said direction of travel of said primary driving mechanism.

4. A conveyor comprising a drum adapted to receive the work, driving means including an endless member having a linear movement and operatively connected to said drum for rotating the same in one direction, and auxiliary means operatively connected to the above said endless member for oscillating the same backwardly and forwardly along its linear path of travel whereby the drum is rotated and simultaneously oscillated about a common axis.

5. A conveyor comprising a drum, endless means, means for continuously moving said endless means in one and the same direction along a predetermined course, said endless means being operatively connected to said drum for rotating the same, and oscillating means operatively connected to said endless means for alternately bodily moving said endless means back and forth along its course at a greater rate of speed than the speed of travel of the endless means in the one direction whereby the drum is simultaneously rotated and oscillated about a common axis.

6. A conveyor comprising a drum adapted to receive the work, a driving chain in which the drum is cradled, idler sprockets over which the chain travels, oscillating supports for said idler sprockets, and means for driving said chain continuously at a uniform speed over said idler sprockets whereby the chain rotates said drum, and means for oscillating the supports for said sprockets so that the one sprocket moves toward the drum while the other sprocket simultaneously moves away from the drum whereby the chain oscillates the drum about its axis of rotation.

7. A conveyor comprising an open ended drum, an endless chain in which said drum is cradled, a frame, rotating sprockets positioned on said frame on opposite sides of its axis of pivoting, said endless chain passing over said idler sprockets, a driving sprocket for driving said chain in one direction whereby as the chain is driven in the one direction by the driving sprocket it is simultaneously oscillated by the oscillating sprockets so that the drum partakes of a rotating and oscillating movement about a common axis.

8. A conveyor comprising work receiving means, means for actuating said work receiving means, primary driving mechanism operatively connected to said actuating means for moving the work receiving means continuously in one direction, and secondary driving means operatively connected to said actuating means for alternately moving said work receiving means and the actuating means bodily in the above said direction and reversely thereof whereby as the work receiving means travels along its course it is simultaneously oscillated back and forth along said course.

9. A conveyor comprising work receiving means, means for actuating said work receiving means, primary driving mechanism for moving said actuating and work receiving means unidirectionally, and secondary driving mechanism for moving said actuating and work receiving means alternately in the same and reverse directions that the primary driving mechanism is moving the work receiving means whereby the work receiving means is oscillated back and forth along its course of travel.

10. A conveyor comprising an open ended drum, an endless chain in which said drum is cradled to rotate about an axis, oscillating supports arranged so that the one support moves toward the said drum while the other support simultaneously moves away from said drum, an idler sprocket positioned on each of said supports, said endless chain passing over said idler sprockets, a driving sprocket for driving said chain uni-directionally whereby as the chain is driven uni-directionally by the driving sprocket it is simultaneously oscillated by the oscillating idler sprockets, the speed of oscillation of the sprockets in the one direction being added to the speed of travel of the endless chain and in the other direction being subtracted therefrom.

11. In a conveyor mechanism for conveying work, a work holder, driving means traveling in one direction along a course with a continuous movement, means for effecting the travel of said driving means, said driving means being operatively connected to said work holder for moving said work holder along a course of travel, oscillating means engageable with said driving means for bodily displacing said driving means along said course of travel of said driving means first in said direction of travel and then in a direction opposite thereto whereby said work holder is provided with an intermittent accelerating and decelerating motion.

12. In a conveyor mechanism for conveying work, flexible driving means traveling in one direction with a continuous movement, means for effecting the travel of said driving means, a driving connection between said work holder and said driving means, and oscillating means engageable with said flexible driving means for bodily displacing a portion of said flexible driving means in one direction in the plane of travel of said driving means and another portion of said driving means simultaneously in an opposite direction and then bodily displacing said portions simultaneously in directions opposite to the previously mentioned directions whereby said work holder is driven by said driving means with an alternating accelerating and decelerating motion.

DONALD C. CAMPION, Sr.

REFERENCES CITED

The following references are of record in the file of this patent:

UNITED STATES PATENTS

| Number | Name | Date |
| --- | --- | --- |
| 458,662 | Pendleton | Sept. 1, 1891 |
| 1,271,433 | Cassell | July 2, 1918 |

FOREIGN PATENTS

| Number | Country | Date |
| --- | --- | --- |
| 546,249 | Germany | Mar. 11, 1932 |

Certificate of Correction

Patent No. 2,520,527 August 29, 1

DONALD C. CAMPION, Sr.

It is hereby certified that error appears in the printed specification of the ab numbered patent requiring correction as follows:

Column 4, line 34, for the words "a frame" read *an oscillating frame*;

and that the said Letters Patent should be read as corrected above, so that the s may conform to the record of the case in the Patent Office.

Signed and sealed this 28th day of November, A. D. 1950.

[SEAL]

THOMAS F. MURPHY,
*Assistant Commissioner of Patent*